(12) United States Patent
Christopher

(10) Patent No.: US 6,808,235 B2
(45) Date of Patent: Oct. 26, 2004

(54) METHOD AND APPARATUS FOR ADJUSTING AUTOMOTIVE SEAT MECHANISMS

(75) Inventor: Hugh Christopher, West Bridgeford (GB)

(73) Assignee: Lear Corporation, Southfield, MI (US)

( * ) Notice: Subject to any disclaimer, the term of this patent is extended or adjusted under 35 U.S.C. 154(b) by 64 days.

(21) Appl. No.: 09/793,473

(22) Filed: Feb. 26, 2001

(65) Prior Publication Data

US 2001/0017481 A1 Aug. 30, 2001

(30) Foreign Application Priority Data

Feb. 28, 2000 (GB) ............................................. 0004715
Aug. 7, 2000 (GB) ............................................. 0019201

(51) Int. Cl.[7] ................................................ B60N 2/02
(52) U.S. Cl. ..................................................... 297/362
(58) Field of Search ........................... 297/362, 354.12, 297/361.1; 16/273, 274, 354; 74/409, 440

(56) References Cited

U.S. PATENT DOCUMENTS

| | | | |
|---|---|---|---|
| 3,221,849 A | | 12/1965 | Klass et al. |
| 4,444,298 A | | 4/1984 | Stangroom |
| 4,744,914 A | | 5/1988 | Filisko et al. |
| 4,815,674 A | | 3/1989 | Blake et al. |
| 5,071,581 A | | 12/1991 | Cipriano |
| 5,098,359 A | * | 3/1992 | Chales et al. |
| 5,305,717 A | | 4/1994 | Wichelhaus |
| 5,652,704 A | | 7/1997 | Catanzarite |
| 5,749,533 A | * | 5/1998 | Daniels |
| 5,779,013 A | | 7/1998 | Bansbach |
| 5,845,753 A | | 12/1998 | Bansbach |
| 6,019,392 A | | 2/2000 | Karlow |
| 6,353,733 B1 | * | 3/2002 | Murray et al. |
| 6,514,001 B1 | * | 2/2003 | Yezersky et al. |
| 2002/0054011 A1 | * | 5/2002 | Bruneau et al. |

FOREIGN PATENT DOCUMENTS

| | | |
|---|---|---|
| DE | 19737766 | 3/1998 |
| EP | 1 065 096 | 1/2001 |
| GB | 2073311 | 10/1981 |
| GB | 2 073 311 | 10/1981 |
| GB | 2125230 | 2/1984 |
| GB | 2189086 | 10/1987 |
| GB | 2 311 094 | 9/1997 |
| GB | 2311094 | 9/1997 |
| JP | 7293597 | 7/1995 |
| SU | 1733771 A1 | 5/1992 |
| SU | 1733772 A1 | 5/1992 |
| SU | 1739243 A1 | 6/1992 |
| SU | 1753107 A1 | 8/1992 |
| SU | 1803650 A1 | 3/1993 |
| WO | 00/53057 | 9/2000 |

* cited by examiner

Primary Examiner—Milton Nelson, Jr.
(74) Attorney, Agent, or Firm—Bill C. Panagos

(57) ABSTRACT

Method and apparatus for adjusting an automotive seat mechanism or adjusting other mechanisms comprising a magneto rheological and/or electro rheological fluid provided in the chamber of a positive fluid displacement device and interconnecting said relatively movable parts whereby changing the status of said fluid enables control of the mechanism, and/or take up of any backlash between movable parts of the mechanism, by virtue of resistance to fluid flow in the activated status of the fluid.

17 Claims, 3 Drawing Sheets

METHOD AND APPARATUS FOR ADJUSTING AUTOMOTIVE SEAT MECHANISMS

CROSS REFERENCE TO RELATED APPLICATIONS

This application claims priority to United Kingdom Patent Application No. 0004715.9 filed Feb. 28, 2000 and United Kingdom Patent Application No. 0019201.3 filed Aug. 7, 2000.

BACKGROUND OF THE INVENTION

This invention relates to a method and apparatus for adjusting automotive seat mechanisms and other mechanisms.

Mechanical seat adjustment mechanisms are the subject of a very large number of published patent specifications. Examples of prior seat adjustment mechanism are shown in GB 2,311,094 and GB 2,073,094, although it will be appreciated that there are a large number of other types of seat adjustment mechanisms. There is an endless quest for improvements in such mechanisms in terms of improvements in efficacy and cost effectiveness. The present invention seeks to provide improvements in relation to at least one of these areas.

More specifically, mechanisms for the stepless adjustment of automotive seat backs relative to automotive seat bases are well known. One of the main problem areas in terms of efficacy and cost-effectiveness relates to the fact that such mechanisms need to provide stepless adjustment in combination with the ability to withstand enormous forces arising from automotive impacts leading to seat-belt-transmitted forces having a very large turning moment at the seat pivot. An additional problem relates to backlash which can develop within the seat adjustment mechanisms and in particular in gear type seat adjustment mechanisms. Such backlash results from clearances between the mating mechanical elements which may be required for operation, arise due to inaccuracies in manufacture, or develop due to wear. Backlash within a seat adjustment mechanism is however undesirable in terms of passenger comfort, safety, and also can increase wear on the seat mechanism components.

SUMMARY OF THE INVENTION

The present invention seeks to provide a new design approach to the construction of steplessly adjustable seat (and other) mechanisms, in accordance with the following.

According to the invention there is provided method and apparatus for adjusting automotive seat and other mechanisms as defined in the accompanying claims.

In an embodiment of the invention described below there is provided a method and apparatus in which locking of a pivot mechanism is used, for example, in an automotive seat pivot or related adjustable seat mechanism, and is achieved by the use of a magneto-rheological (MR) or electro-rheological (ER) fluid in association with a displacement-sensitive mechanism whereby the combination is responsive to selective changes in the status of the fluid in accordance with the principle that when the fluid is selectively caused to adopt its rheologically activated status it interacts with the mechanism on account of the volume-sensitive pumping action (as it may be termed) of the latter whereby the mechanism is effectively locked when filled (or sufficiently filled) with such a fluid.

By providing the combination of a selectively rheologically status-changeable fluid in association with a volume-sensitive mechanism (for example having a pumping action), the means is provided for achieving a selective and stepless locking action which is instantly (or at least quickly) changeable from its locking to its unlocking status by mere actuation of a magneto or electro-responsive system and without the need for the conventional mechanical disengagement of pawls from ratchets or friction elements from friction surfaces to which they are locked.

Moreover, the use of MR/ER fluids enables the adoption of mechanisms having only modest levels of manufacturing tolerances (and thus which can be manufactured at correspondingly relatively modest costs), and this is due to the fact that the MR/ER fluids interact with the mechanism in a second and likewise unexpected manner in the sense that the adoption of modest and cost-effective tolerances is offset by the ability of the MR/ER fluids (in their activated condition) to interact with the interstices of the associated mechanism (but only in the volume-sensitive and/or pumping environment) so as to offset what might otherwise be arguably unacceptably low manufacturing standards. The MR/ER fluids also effectively off set and reduce any backlash within the mechanisms do to clearances developing as a result of tolerance variations. In addition as the mechanism wears the tolerance variations increase. The MR/ER fluids are able to compensate for this increase, maintaining the overall standard of the mechanism, and maintaining a secure mechanism with little backlash Accordingly, it can be seen that the embodiments of the invention offer a system in which a fluid medium having selectively controllable properties which enable those properties to be conveniently and instantly switched from one status to another, is able to perform a function which is, in principle, not within the previously realised operational parameters of such fluids. The present invention's embodiments take no account of previous unpublished proposals for the use of such fluids in damping mechanisms, useful though such functions may be. Conventional damping fluids have no function whatever in relation to the locking of mechanisms, and are likewise of no utility for the purposes of the present invention. The embodiments of the present invention take advantage of the known property of the changeable status of magneto- and electro-rheological fluids, and use this known property in association with a mechanism which is sensitive to (and thus responds differently according to) the changes in those rheological properties which can be selectively commanded by the operator.

As to the mechanisms which, in association with MR and ER fluids can provide the necessary responsiveness to that status change, the following applies. One embodiment of the invention which employs such a mechanism utilises the fluid volume implications inherent in (but previously unappreciated) the meshing relationship between a toothed annular internal periphery gear and a pinion meshing therewith and having a numerical tooth differential as between the two gears whereby the known effect of such a twin gear train is utilised in present seat adjustment mechanisms (for stepless control of the seat back angular position). Such a mechanism requires a high degree of precision manufacture. The tolerances required are fine in order to achieve the necessary absence of backlash in the mechanism when in use.

The present invention in one of its embodiments, uses the previously unrecognised fluid volume implications of this gear train in combination with the status-change selectively available properties of MR and ER fluids to enable such a mechanism to be effective in use without the need for the high degree of precision which has hitherto have been required.

Other related mechanisms exist which can be likewise locked in similar way. Such mechanisms share with the above-mentioned embodiment the following properties including (as previously discussed) volume sensitivity.

Said volume-sensitive mechanism comprise in the embodiments a positive displacement mechanism. Examples of such mechanisms including gear lobe mechanisms, piston mechanisms, and peristaltic mechanisms.

In the embodiments the effect of the positive displacement characteristic of the mechanism is to cause the actual displacement of a specific volume of fluid, such displacement involving, effectively, a fluid coupling from the positive displacement device to, in the embodiments, a fluid flow restriction device whereby the effect of the controllable flow characteristic of the MR or ER fluid effectively interposes a medium allowing (or not) the actual displacement of such fluid by the relative movement of the parts of the positive displacement device driving same.

In the embodiments the positive displaced fluid is able, when the MR/ER fluid has not been caused to adopt its activated non-free flowing condition, to circulate within the mechanism from the zone of displacement to a flow-and-return zone which permits those functions namely displacement, outward flow and return. The restriction function is designed-into the apparatus in order to cooperate with the selective fluid viscosity control function so as to amplify or exaggerate the flow-inhibition which is inherent in the characteristics of the fluid at that end of its flow range.

In the illustrated embodiments the mechanism is constructed in the form of a constant mesh gear pair mechanism having an aggregate tooth sum differential between the internal/external teeth of the gear pair, thereby producing resultant inner gear bodily movement with consequential fluid displacement via a restricted path.

In another illustrated embodiment the general arrangement is similar to that just described but with axially instead of radially facing gear surfaces.

A particularly preferred embodiment of the invention provides a method and apparatus employing a magneto-rheological fluid which is caused to change between its available physical states by actuation of permanent magnet means, thereby obviating the requirement for relatively high-voltage means for effecting this status change in an electro-rheological fluid.

In this preferred embodiment the means adopted for effecting the required structural or mechanical locking is provided by a known mechanical locking mechanism, for example of the kind employed meshing outer (ring type) and inner (pinion type) gears which provide a well known locking function which is widely used in seat adjustment mechanisms. Such mechanical locking means may, for example, be used to lock the pivotal position of a seat back. Such mechanism may also be included within the adjustment means which incorporate such gear drives or similar and which are provided to adjust the fore and aft position of the seat, to adjust the seat height, or provide other adjustments. In these cases the gear mechanism is effectively and selectively locked in position.

In accordance with this embodiment of the present invention this meshing mechanism is caused to be supplied into the nip between its meshing gears, with a medium in the form of the magneto-rheological fluid in its non-flowable physical form whereby that medium is effectively gripped and fed between the in-running teeth of that mechanism, thereby causing a jamming effect which can be compared with the effective seizure of a drive mechanism such as a piston engine, when (for example for lack of lubrication) free relative movement of its parts can no longer take place. The gear mechanism is effectively jammed by a sector-shaped element of solid material (effectively formed in-situ when the status of the magneto-rheological fluid is changed in response to user actuation of a magnetic field directed at the fluid), and is thereby rendered immovable.

It will be understood that the mechanism is in any case steplessly lockable in a chosen position by virtue of the gear design itself so that it might be thought that such provision amounts to an unnecessary duplication. In fact, in the embodiments, the two effects are supplemental or additive rather than the one being a duplication of the other as will be explained. In addition the fluid nature (in an inactivated state) of the MR/ER fluids means that the fluid can fill an occupy and clearances that may exist or develop between the mating locking mechanical components. Consequently the fluid within these clearances, when activated can solidly and rigidly take up any clearance and therefore reduce movement between the mating mechanical components of the mechanism thereby reducing backlash.

The provision of a well known and well-proved mechanical locking mechanisms for seat adjustment purposes meets the obvious requirement for compliance with regulations applying to automotive vehicles in terms of meeting repetitive application of defined loads etc etc. The addition to such a mechanism effectively causing it to selectively seize (by means of the magneto-rheological fluid) has the unexpected benefit of allowing that mechanism to be constructed at tolerance levels which enable production to be adopted on a far more economical basis than hitherto. In short, the magneto-rheological jamming or seizure mechanism enables a cheap mechanical seat lock to perform as if it were manufactured to the highest (or anyway at least higher than those actually adopted) manufacturing standards in terms of tolerances etc.

Thus, this aspect of the invention provides a mechanical seat portion adjustment mechanism comprising a mechanical adjustment mechanism comprising a pair of in-running meshing gears, or other drive devices, in which provision is made for jamming or seizure by the use of a rheological fluid and corresponding status-adjustment means therefor, whereby lesser standards of manufacturing precision can be adopted while providing a satisfactory level of absence of mechanical backlash, lost motion or the like.

Constructional details of a suitable mechanical seat adjustment mechanism involving in-running gears are to be found, for example, in UK Patent applications GB 2,311,094 and GB 2,073,311 which are incorporated herein by reference. These prior patents describe such mechanisms generally. It should be noted that as described in these prior patents a certain degree of clearance and tolerance in the meshing of the teeth is required in these type of locking drive mechanisms. This is due in particular to the differential in the number of teeth of each of the gears and their specific arrangement which provides the locking function. However such a clearance and tolerance in the meshing of the gear teeth does introduce backlash into the mechanism which is generally undesirable. Accordingly these propr patents describes specific mechanical modifications to such mechanism aimed to address the above described problem of backlash and play in such mechanisms. Other patents for such similar arrangements and other proposals to which the invention is also applicable and beneficial also exist.

BRIEF DESCRIPTION OF THE DRAWINGS

Embodiments of the invention will now be described by way of example with reference to the accompanying drawings in which.

DETAILED DESCRIPTION OF THE INVENTION

Figure 1:
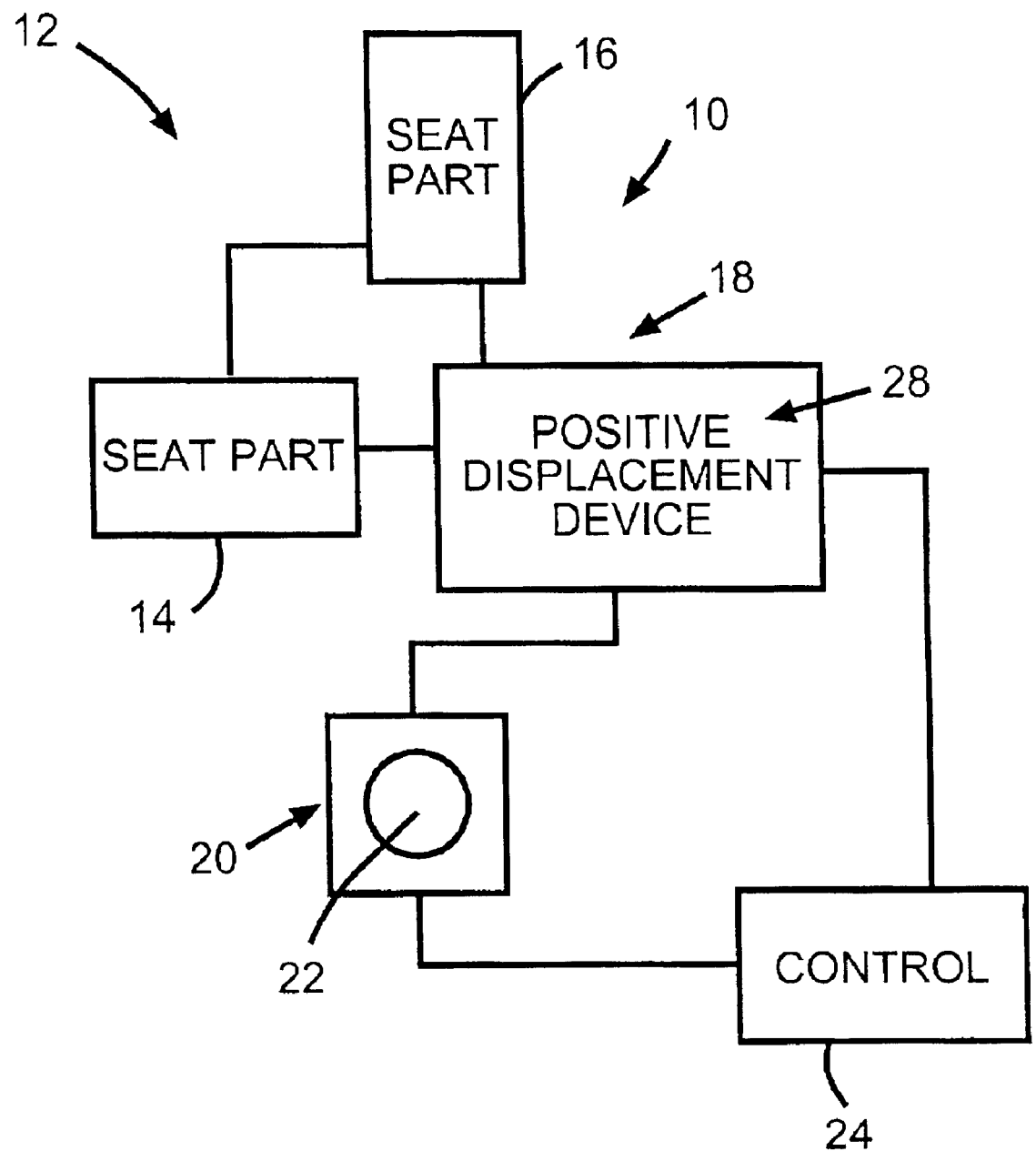
FIG. 1 shows a diagrammatic representation of an automotive seat mechanism and an associated mechanism permitting stepless control of relative movement of the seat parts.

As shown in FIG. 1, apparatus 10 providing a method for adjusting an automotive seat mechanism 12 comprising a pair of relatively movable (in this case) pivotal seat members 14, 16, providing a seat base and a seat back respectively, provides a mechanism 18 interconnecting members 14, 16 for their relative (pivotable) movement.

The mechanism 18 interconnecting seat parts 14 and 16 comprises a mechanism permitting stepless control of the relative movement of the seat parts by actuation of a control element 20 associated with the mechanism 18. Control element 20 comprises a seat control button 22 arranged to actuate a control mechanism 24 for the purpose of changing the status of a magneto-rheological and/or electro-rheological fluid within mechanism 18, for a purpose to be described.

Turning now to interconnecting mechanism 18 in more detail, this mechanism comprises a fluid chamber 26 (see FIGS. 3 and 5) in which magneto-rheological and/or electro-rheological fluid is provided, together with a positive displacement mechanism 28 (see FIGS. 2 and 5), mechanically interconnecting the seat members 14 and 16.

The arrangement in the embodiments is such that the actuation of control button 22 in association with control mechanism 24 (to change the status of the MR/ER fluid) enables movement of the seat parts 14 and 16 to be controlled.

Figure 3:
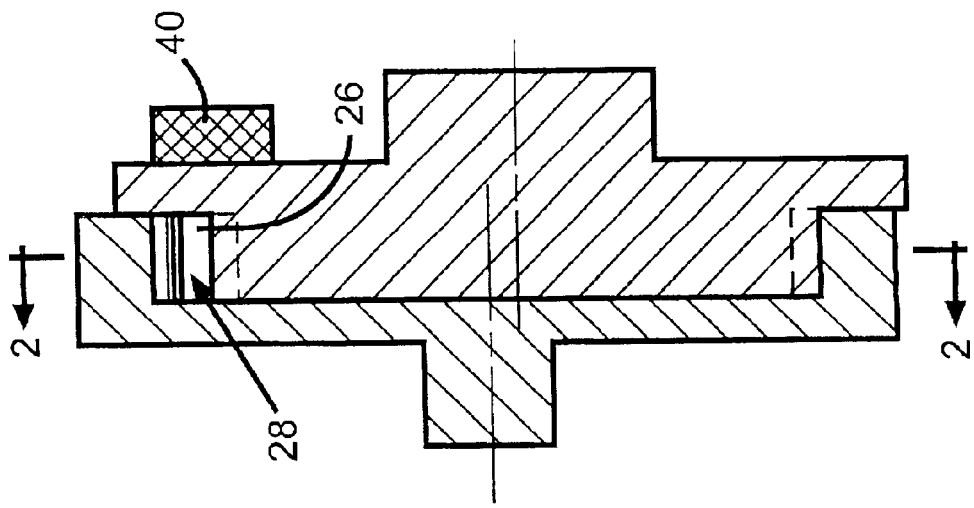
FIGS. 2 and 3 show sectional views through a positive displacement device (FIG. 2 being a section in the plane indicated by arrows II—II in FIG. 3), the positive displacement device forming part of the mechanism of FIG. 1.
Figure 2:
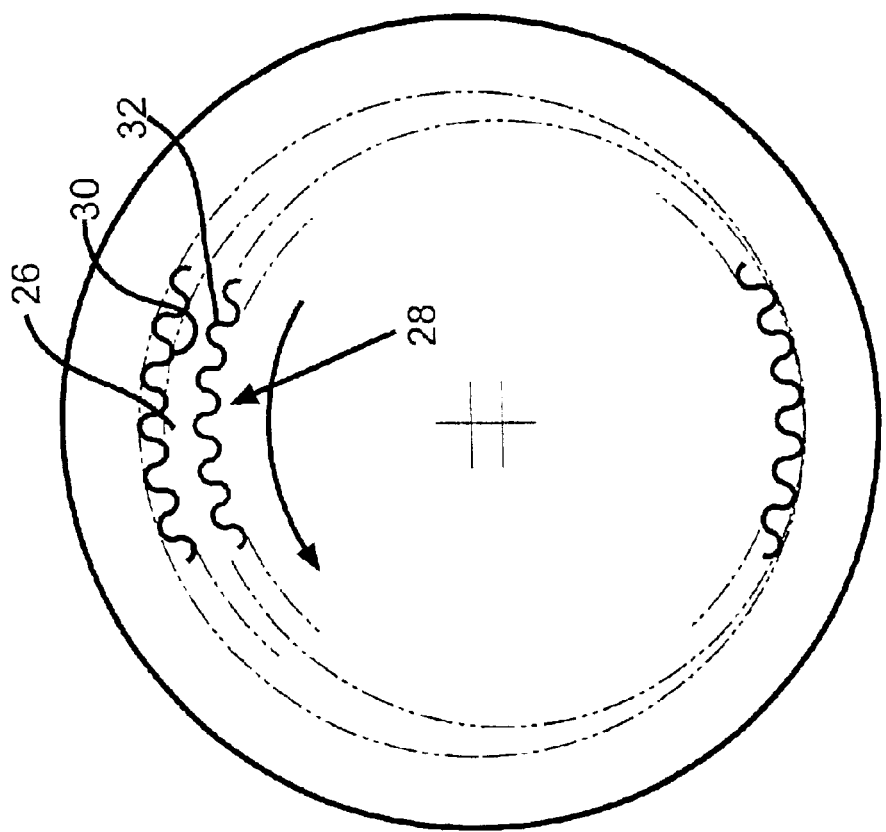

In the embodiment of FIGS. 2 and 3, the positive displacement mechanism 28 comprises constant mesh gears 30, 32 arranged as an outer annular gear 30 and an inner pinion gear 32 respectively with a tooth sum differential of two teeth, as indicated, whereby relative rotation produces a positive displacement effect under the conditions of seat adjustment using a conventional (or motor driven) hand or power adjustment arrangement for the seat. As such the mechanism is generally similar to known gear type locking adjustment and mechanisms as for example described in UK Patents GB 2,073,311 and GB 2,311,094 which are incorporated herein by reference.

The basic locking drive mechanism comprises a first ring gear 30 fixedly mounted to a first seat part (eg. seat back) and a pinion gear 32 fixedly mounted on a second seat pat (e.g seat base). The pinion gear 32 is eccentrically located within the ring gear 30 and the two gears are arranged in a meshing relationship. The two gears have different number of teeth such that there is a numerical tooth differential between the gears. The pinion gear 32 is eccentrically mounted on a drive shaft (not shown) which is rotatably received in the first seat part for rotation about an axis co-axial with the ring gear. Accordingly, rotation of the drive shaft causes the pinion gear 32 to progress around the axis of the ring gear 30 and in so doing causes the pinion gear 32 to rotate about its own axis. Such rotation (and due to the aggregate difference in the number of teeth of the two gears) causes angular displacement of the two seat parts pivotally mounted by the mechanism.

With such gear meshing mechanisms the MR/ER fluid is supplied, and contained within, the interstices and volume spaces defined between the mating gears 30,32 and teeth thereof. In an inactivated state the MR/ER fluid freely flows between the interstices and between the gears 30,32 as they relatively rotate and the seat is adjusted. However upon actuation of the control mechanism 24 the MR/ER fluids are caused to adopt their activated state. In this state the MR/ER fluids adopt a non-free flowing state. As a result displacement and flow of the fluid from the interstices and between the gears is restricted and prevented. Consequently relative movement of the gears 30,32 is thereby prevented and the gears 30,32 become locked. In other words activation of the MR/ER fluids into their activated state causes the mechanism to in effect selectively seize.

In simple terms, when the MR/ER fluid is caused to adopt its activated status, the mechanism is effectively locked in its adjusted position. Further adjustment is readily accomplished by changing the status of the fluid by means of button 22 and adjusting in the usual way.

In its in-activated state the magneto-rheological fluid will flow into and fill any clearance between the engaged teeth of the meshing gears 30,32. As a result when the magneto-rheological fluid is activated the solid form which it adopts will accurately, complementally and correspondingly match that of the clearance between the meshing gears 30,32 and the respective teeth. As a result the magneto-rheological fluid will take up and accommodate any variation in the size of the clearance between the engaging teeth and any play as a result of variations in the clearances are eliminated or at least substantially reduced. Consequently the gears 30,32 and teeth thereon can be manufactured to lower tolerances without introducing excessive play, backlash or lost motion into the mechanism when activated. In addition the clearances required in such mechanisms to allow them to operate is also taken up by the MR/ER fluids and so when the MR/ER fluid is activated and the mechanism locked these clearances will also be taken up and backlash in the locked state is reduced generally without adversely affecting operation of the mechanisms to adjust the seat position.

Figure 5:
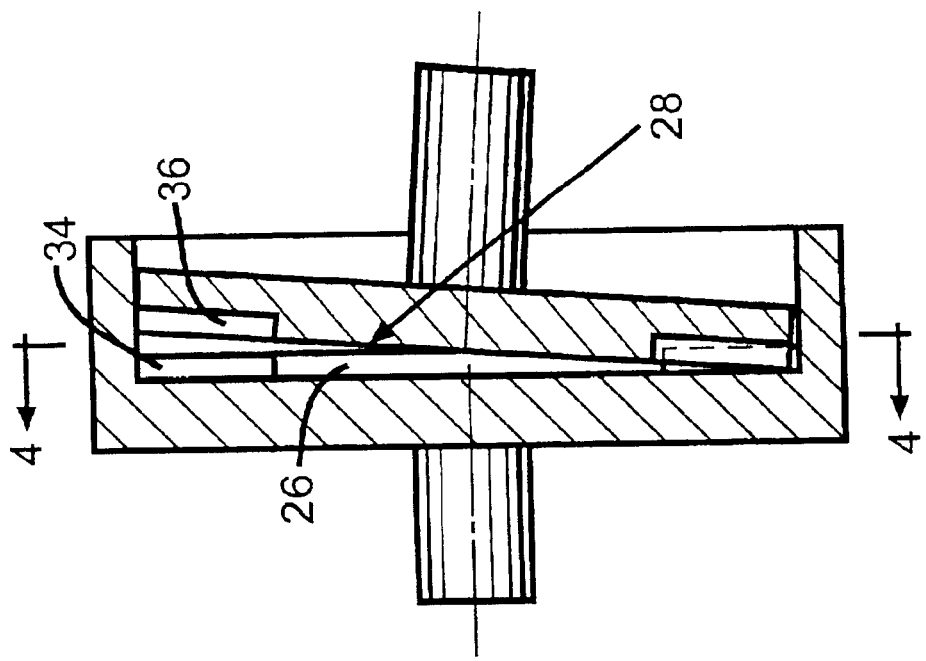
FIGS. 4 and 5 show corresponding views through a second embodiment of the positive displacement device showing, respectively, a generally axial view of the gear teeth and an axial section through the positive displacement device respectively.
Figure 4:
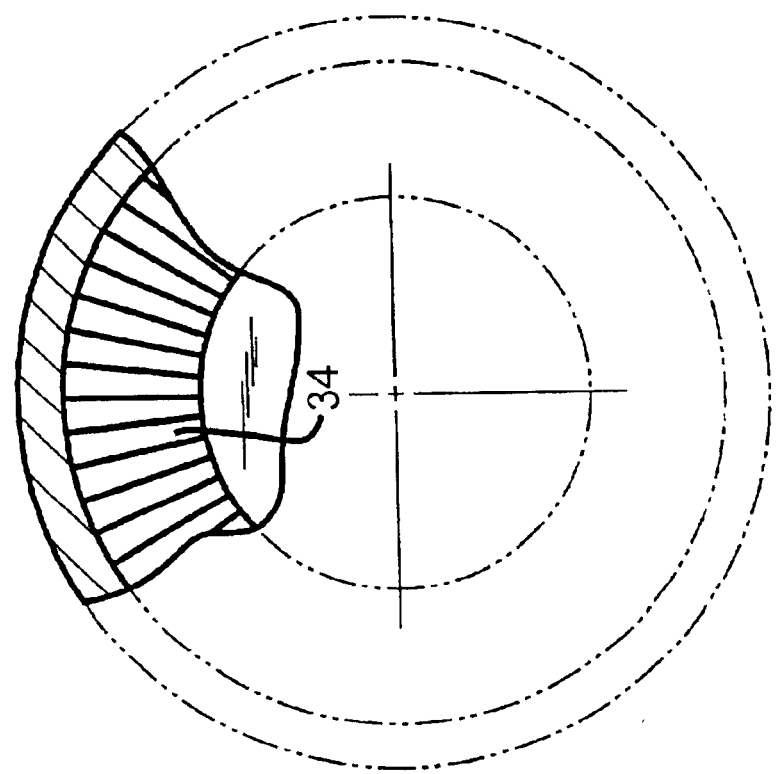

There is illustrated in FIGS. 4 and 5, an alternate embodiment of a positive displacement mechanism having mating concentric gear faces 34 and 36. The mating of the gear faces 34 and 36 provides a wave format whereby a comparable positive displacement or pumping effect is produced by virtue of relative axial movement of the gear faces as rotation occurs.

The magneto-rheological and electro-rheological fluids in the above embodiments are of the kind which are known in themselves and comprise ferrite particles held in a suspension in fluid carrier medium, typically an oil. The MR/ER fluids can be caused by electrical and/or magnetic fields to adopt an aligned attitude having an activated status in which their flow resistance is increased. Such fluids are available from and/or known to Lord Corporation which holds patents in relation thereto.

As is known, actuation of, and changing the status of, MR/ER fluids is effected by selectively subjecting such fluids respectively to a magnetic or electric field. Accordingly the control mechanism 24 comprises a means for selectively directing a respective magnetic and/or electric field in the region of the MR/ER fluid within the mechanism.

In the embodiment shown in FIG. 3 an MR fluid is used. The control mechanism 24 comprises an electro magnet 40 located adjacent to the cavity filled with the MR fluid. Selective activation and supply of an electric current to the electromagnet 40 generates a magnetic field which causes activation of the MR fluid.

Alternatively the electromagnet 40 could be replaced with a permanent magnet. The magnet is mounted upon suitable movable means which, when operated by a user, are arranged to move the magnet from a first to a second position relative to the mechanism, and specifically relative to cavity 26 filled with the MR fluid. In a first position the permanent magnet is positioned adjacent to the cavity filled with the MR fluid such that the MR fluid is subjected to a magnetic field from the permanent magnet and is in a activated state. In the second position the magnet is remote from the cavity 26 filled by the MR fluid, and/or the magnetic filed of the magnet is realigned with respect thereto, such that the MR fluid there within is not subject to (or does not respond to) the magnetic field from the magnet and/or the magnetic field in the region of the cavity 26 and MR fluid is substantially reduced. As a result in the second position the MR fluid is in an inactive, free flowing state.

The use of a permanent magnet to activate the MR fluid is, from a practical perspective preferred. This is because the seat adjustment mechanism will normally be in a locked state. Accordingly normally, and for most of the time the magnetic filed will be applied to the MR fluid, and a permanent magnet is more suitable than continually having to supply electrical power to an electro magnet arrangement. A permanent magnet arrangement will also be fail safe with the MR fluid being activated and the seat mechanism locked in the event of power failure. It should also be noted that in order to keep the particles suspended within the fluid, and so maintain the condition of the MR fluid, over a prolonged period, it is desirable for a magnetic field to be continually or periodically applied. Therefore an arrangement where the magnetic filed is normally applied, and the use of a permanent magnet means to apply the field is preferred.

In a yet further embodiment the control means 24 could comprise a combination of an electromagnet and permanent magnet. In such a case the permanent magnet would be arranged to normally apply a magnetic field to the MR fluid to cause the required activation of the MR fluid. The electromagnet is then located and arranged to provide a cancelling magnetic force (i.e oppositely direct to the permanent magnet). Activation of the electromagnet would then cancel out the magnetic field generated by the permanent magnet such that overall no magnetic filed is applied to the MR fluid which will then become deactivated. Such an arrangement maintains the advantages of the previously discussed permanent magnet arrangement, which the use of an electromagnet may be easier to implement than a mechanical arrangement for alter the position of the permanent magnet, in particular in a power seat adjuster arrangement.

Either magneto-rheological or electro-rheological fluids can be used to provide the selective locking of the mechanisms. However it is generally preferred to use magneto-rheological fluids which are activated by the action of a magnetic field produced by an electro or permanent magnet. This is because current electro-rheological fluids require the use of relatively high voltages to provide the required electric field to change the state of ER fluid. Such high voltages are difficult to achieve and, in particular within an automobile seat application, which is in close proximity to an occupant, are undesirable.

It will be appreciated by those skilled in the art that whilst between an inactivated and activated state the viscosity of an ME/ER fluid changes substantially and dramatically, the fluids never become fully solid. The substantial change in viscosity is however sufficient to provide the functions described above. It is though, as described preferable, but not essential, to include a mechanical locking mechanism in conjunction with the MR/ER locking or clearance take up arrangement.

In other embodiments of the invention an MR/ER grease could be used in place of the MR/ER fluid. Such an MR/ER grease would comprise ferrite particles (or other suitable known particles to provide the MR/ER function used in conventional MR/ER fluids) suspend an held within a grease as the carrier medium. Such an MR/ER grease, in an inactivated state would have an higher viscosity than a MR/ER fluid. As such the MR/ER grease is easier to contain within the mechanism. Due to the higher in activated viscosity, when activated an MR/ER grease is also more solid than a corresponding MR/ER fluid under the same activating field.

The MR/ER fluids or grease used with the seat adjustment mechanisms also advantageously lubricate the seat adjustment mechanisms.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A seat adjustment mechanism for adjusting the position of seat parts, the mechanism being of a type comprising a pair of meshing gears engaged with one another and which are adapted to provide a locking drive, the meshing gears being arranged such that a degree of backlash is defined by and exists between respective meshing teeth of the gears in a locked state of said mechanism, characterised in that one of a magneto-rheological and electrorheological fluid at least partially occupies a clearance space defined between said pair of meshing teeth of said pair of meshing gears, and activation means are provided to activate and change the state of the said one of a magneto-rheological and electrorheological fluid within said clearance space such that the activated one of a magneto-rheological and electro-rheological fluid, substantially locks the pair of meshing gears relative to one another, thereby reducing said backlash defined between said adjacent teeth of said meshing teeth.

2. A seat adjustment mechanism as claimed in claim 1 in which the meshing gears comprise an externally toothed pinion gear which is mounted within and meshes with a internally toothed annular gear ring, the pinion gear and annular gear ring having a numerical tooth differential.

3. A seat adjustment mechanism as claimed in claim 1 in which the clearance space defined between the meshing teeth is a result, at least in part, of dimensional tolerance errors in the dimensions of the gears and teeth thereon.

4. A mechanism comprising first and second elements moveably mounted relative to one another, the first element is arranged to engage the second element with a clearance space defined between the first and second elements; characterised in that one of a magneto-rheological and electrorheological fluid at least partially occupies the clearance space between the first and second elements, and activation means are provided to activate and change the state of the one of a magneto-rheological and electrorheological fluid within the clearance space such that the activated one of a magneto-rheological and electrorheological fluid substantially prevents movement between the first and second elements due to the clearance, wherein the first and second elements each comprise toothed gears meshed with one another and the clearance space is defined between meshing teeth of the gears.

5. A mechanism as claimed in claim 4 in which the clearance space defined between the first and second elements is a result, at least in part, of dimensional tolerance errors in the dimensions of the first and second elements.

6. A mechanism as claimed in any one of the preceding claims in which a magneto rheological fluid is used.

7. A mechanism as claimed in claim 6 in which said activation means comprise a permanent magnet arrangement.

8. A mechanism as claimed in claim 1 in which the one of a magneto-rheological and electrorheological fluid comprise a grease.

9. A seat adjustment mechanism as claimed in claim 1 in which said activation means comprise a permanent magnet arrangement.

10. A seat adjustment mechanism as claimed in claim 1, wherein said pair of meshing teeth define a running nip region therebetween, and wherein said clearance space is defined as said running nip region.

11. A seat adjustment mechanism as claimed in claim 4 in which the one of a magneto-rheological and electrorheological fluid comprise a grease.

12. A method of reducing mechanical backlash of a mechanism which comprises a first and second relatively moveable elements of which the first element is arranged to engage the second element with a clearance space defined between the first and second elements, the first and second elements comprising toothed gears meshed with one another, wherein the method comprises providing one of a magneto-rheological and electrorheological fluid which at least partially occupies the clearance space between the first and second elements, and providing and operating activation means to selectively activate and change the state of the one of a magneto-rheological and electrorheological fluid within the clearance space to substantially lock the first and second elements relative to one another.

13. A method as claimed in claim 12 in which the one of a magneto-rheological and electrorheological fluid comprise a grease.

14. A method as claimed in claim 12 in which a magneto rheological fluid is used.

15. A method as claimed in claim 14 in which the said activation means comprise a permanent magnet arrangement.

16. A method of adjusting a mechanism characterised by interconnecting relatively movable elements of said mechanism through a positive displacement mechanism comprising one of a magneto-rheological and electrorheological fluid, and causing activation of means for changing the status of said fluid to substantially lock the movable elements together, wherein said movable elements comprise meshing gears rotatably mounted relative to one another and spaced apart defining a clearance space therebetween, and wherein said one of a magneto-rheological and electrorheological fluid is disposed in said clearance space.

17. A method according to claim 16 including flow resistance means associated with said positive displacement mechanism.

\* \* \* \* \*